(12) United States Patent
Lopez et al.

(10) Patent No.: US 9,807,929 B2
(45) Date of Patent: Nov. 7, 2017

(54) MOWER DECK SIDE DISCHARGE CHUTE MOUNTING

(71) Applicant: Deere & Company, Moline, IL (US)

(72) Inventors: Ivan Jesus Lopez, Monterrey (MX); Juan Luis Lara, NL (MX); Kyle T. Ressler, West Bend, WI (US)

(73) Assignee: DEERE & COMPANY, Moline, IL (US)

( * ) Notice: Subject to any disclaimer, the term of this patent is extended or adjusted under 35 U.S.C. 154(b) by 169 days.

(21) Appl. No.: 15/001,842

(22) Filed: Jan. 20, 2016

(65) Prior Publication Data

US 2017/0202140 A1   Jul. 20, 2017

(51) Int. Cl.
*A01D 34/81* (2006.01)
*A01D 34/71* (2006.01)
*A01D 101/00* (2006.01)

(52) U.S. Cl.
CPC ............ *A01D 34/81* (2013.01); *A01D 34/71* (2013.01); *A01D 2101/00* (2013.01)

(58) Field of Classification Search
CPC .... A01D 34/001; A01D 34/125; A01D 34/49; A01D 34/667; A01D 34/71; A01D 34/81; A01D 34/828
See application file for complete search history.

(56) References Cited

U.S. PATENT DOCUMENTS

| | | | |
|---|---|---|---|
| 3,797,214 A | | 3/1974 | Erdman et al. |
| 3,872,656 A | * | 3/1975 | Dahl .................. A01D 43/0631 56/202 |
| 4,008,559 A | | 2/1977 | Lessig, III et al. |
| 4,041,682 A | * | 8/1977 | Kidd ...................... A01D 34/71 56/320.2 |
| 4,726,178 A | * | 2/1988 | Mallaney ............... A01D 34/71 56/202 |
| 5,410,867 A | * | 5/1995 | Plamper ............... A01D 42/005 49/386 |
| 5,442,902 A | * | 8/1995 | Mosley ................ A01D 42/005 56/17.5 |
| 5,913,804 A | * | 6/1999 | Benway ................. A01D 34/71 56/202 |
| 5,992,135 A | * | 11/1999 | Benway ................. A01D 34/71 56/200 |
| 6,986,240 B2 | | 1/2006 | Kallevig |
| 7,328,566 B2 | * | 2/2008 | Kallevig ................ A01D 34/82 56/320.2 |

(Continued)

OTHER PUBLICATIONS

X304 Select Series Tractor: Mower Deck, Chute and Gage Wheels. John Deere Parts Catalog [online]. Deere & Company, 2015 [retrieved on Dec. 15, 2015]. Retrieved from the Internet: <URL: http://jdpc.deere.com/jdpc/servlet/com.deere.u90490.partscatalog.view.servlets.HomePageServlet>.

(Continued)

*Primary Examiner* — Robert Pezzuto
*Assistant Examiner* — Adam Behrens

(57) ABSTRACT

A mower deck side discharge chute mounting includes a wire form hinge having a first leg, a second leg that is collinear with the first leg, and an intermediate mounting portion attached directly to a multi-blade mower deck between the first leg and the second leg. A side discharge chute pivots on the wire form hinge and can be installed or removed from the wire form hinge only if the chute is in a raised position relative to the mower deck.

8 Claims, 6 Drawing Sheets

(56) References Cited

U.S. PATENT DOCUMENTS

| | | | |
|---|---|---|---|
| 7,610,742 B2 * | 11/2009 | Imanishi | A01D 34/71 56/320.1 |
| 7,726,110 B2 | 6/2010 | Nicholson | |
| 7,980,050 B2 | 7/2011 | Imanishi et al. | |
| 2003/0182919 A1 * | 10/2003 | Baumann | A01D 34/71 56/320.1 |
| 2010/0031620 A1 * | 2/2010 | Uemura | A01D 34/71 56/11.8 |

OTHER PUBLICATIONS

X500 Multi-Terrain Tractor: Mower Deck, Chute and Gage Wheels. John Deere Parts Catalog [online]. Deere & Company, 2015 [retrieved on Dec. 15, 2015]. Retrieved from the Internet: <URL: http://jdpc.deere.com/jdpc/servlet/com.deere.u90490.partscatalog.view.servlets.HomePageServlet>.

X710 Signature Series Tractor: Mower Deck/ Dicharge Chute, Mid-Mount Mower, 48C, John Deere Parts Catalog [online]. Deere & Company, 2015 [retrieved on Dec. 15, 2015]. Retrieved from the Internet: <URL: http://jdpc.deere.com/jdpc/servlet/com.deere.u9040.partscatalog.view.servlets.HomePageServlet>.

X710 Signature Series Tractor: Mower Deck/ Discharge Chute, Mid-Mount Mower, 60HC. John Deere Parts Catalog [online]. Deere & Company, 2015 [retrieved on Dec. 15, 2015]. Retrieved from the Internet: <URL: http://jdpc.deere.com/jdpc/servlet/com.deere.u90490.partscatalog.view.servlets.HomePageServlet>.

* cited by examiner

MOWER DECK SIDE DISCHARGE CHUTE MOUNTING

FIELD OF THE INVENTION

This invention relates generally to rotary mower decks carried by tractors or other grass mowing machines. More specifically, the invention relates to a mower deck side discharge chute mounting on a multi-blade rotary mower deck.

BACKGROUND OF THE INVENTION

Tractors, utility vehicles or zero turn mowers used for lawn care may carry mower decks covering two or more rotary cutting blades on the lower ends of vertically oriented spindles. A multi-blade mower deck may be attached to the traction vehicle with mechanical linkages that allow the deck to be carried at a range of different cutting heights, and raised or lowered between each height. The blade spindles may be rotated by one or more belts and pulleys above the top surface of the deck, which may be driven by a belt and/or power take off shaft connected to the engine or other power source.

Multi-blade mower decks typically include side discharge outlets or openings in the side of the deck for grass clippings cut by the blades to exit from the deck where they are deposited onto the ground. A side discharge chute, also called a deflector or guard, may be mounted to extend laterally outwardly and downwardly over the side discharge outlet. The chute may be flexible, such as a rubber or plastic material, and may direct clippings downwardly into the turf alongside the mower deck.

In the past, side discharge chutes typically are mounted to multi-blade mower decks using a hinge support fastened to the deck adjacent the side discharge opening. A pin may be inserted through holes or bearings on the hinge support and the edge of the chute, and secured with a nut. A torsion spring around the pin may bias the chute to the closed or downward position, allowing the side discharge chute to pivot upwardly if it comes in contact with an obstacle or the deck is converted from a side discharge mode to a bagging mode. Optionally, an additional torsion spring may be used to close a second or inner chute that may be pivotably mounted under the main side discharge chute. When closed, the inner chute may cover a top portion of the side discharge opening.

A mower deck side discharge chute mounting is needed for a multi-blade mower deck, having fewer parts, that is faster and less costly to install, has reduced complexity, and may include mounting an optional second inner chute.

SUMMARY OF THE INVENTION

A mower deck side discharge chute mounting on a multi-blade mower deck includes a wire form hinge having a first leg and a second leg and an intermediate portion mounted directly to the mower deck. A torsion spring on the wire form hinge biases the side discharge chute toward a lowered position. Radial projections on the first and the second legs fit through keyways on the bearings allowing the side discharge chute to slide on or off the wire form hinge only in a raised position.

DESCRIPTION OF THE PREFERRED EMBODIMENT

Figure 1:
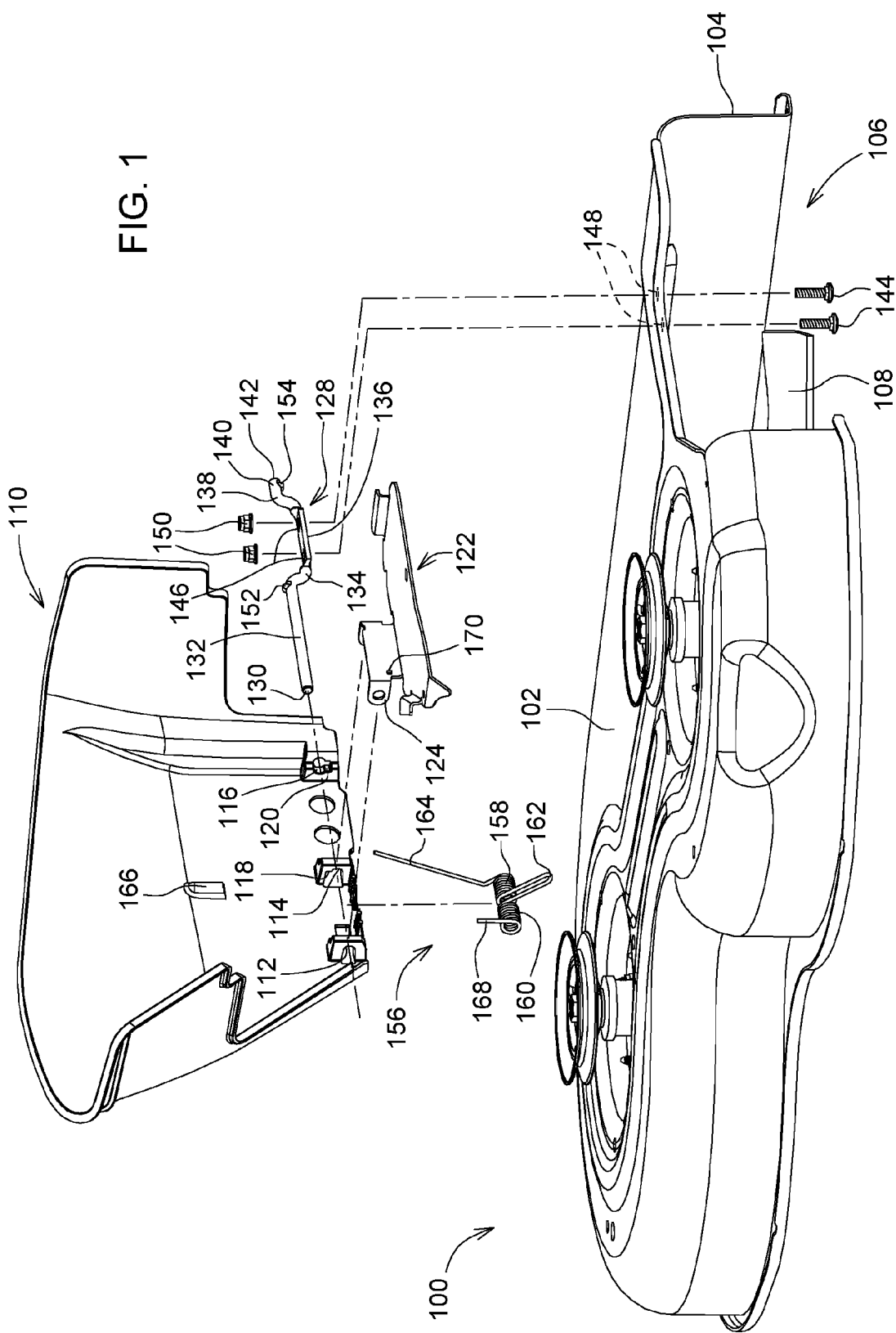
FIG. 1 is an exploded perspective view of a mower deck side discharge chute before mounting on a multi-blade mower deck, according to a first embodiment of the invention.

As shown in FIGS. 1-6, in a first embodiment, multi-blade mower deck 100 may be positioned under a tractor, utility vehicle or zero turn mower, preferably between the front and rear wheels of the traction vehicle. The multi-blade mower deck may have a pair of generally circular cutting chambers with a rotary cutting blade mounted in each cutting chamber on the lower end of vertically oriented blade spindles. Alternatively, the multi-blade mower deck may have three cutting chambers and three rotary cutting blades. The deck may have a generally horizontal top surface 102 surrounded by a downwardly depending skirt 104. A belt and pulley system may transmit power from an internal combustion engine or other power source to the spindles to rotate the mower blades.

In a first embodiment, multi-blade mower deck 100 may have side discharge outlet 106 through skirt 104 at the front and right or left side of the mower deck. Side discharge outlet 106 also may extend through part of the deck's top surface 102 over one of the cutting chambers. As a result, part of the side discharge outlet may be located over a region of mower blade 108 that cuts and lifts grass clippings.

In a first embodiment, first or main side discharge chute 110 may extend laterally outwardly and downwardly over the side discharge outlet. The main chute may be flexible, such as a rubber or plastic material, and may direct clippings downwardly into the turf alongside the mower deck. A plurality, and preferably three openings or bearings 112, 114, 116 may be provided along the inner edge the main chute. Each of the bearings may be circular openings, and bearings 114, 116 also may include keyways 118, 120 adjoining the opening, as will be explained in more detail below.

In a first embodiment, an optional second or inner chute 122 may be mounted under main chute 110. The inner chute may be a sheet metal component having a plurality of openings or bearings 124, 126 along the inner chute's inner edge. When inner chute 122 it mounted on a multi-blade mower deck along with main chute 110, the inner chute may cover a top portion of the side discharge opening.

In a second embodiment, the mower deck side discharge chute mounting may include main chute 110, but not a second or inner chute. The second embodiment also may include a single torsion spring, instead of the double torsion spring 156 described below. Other components of the second embodiment may be the same as the first embodiment. Mounting the second embodiment may be the same as the first embodiment, but without the inner chute or double torsion spring.

In a first embodiment, the mower deck side discharge chute mounting may include wire form hinge 128. The wire form hinge may be any wire, rod or bar having a diameter or thickness of at least about ¼ inch, and is sufficiently rigid to function as both a hinge support and pivoting pin for the side discharge chute. The wire form hinge preferably has a round cross section, or a similar cross section, that can slide through bearings or holes on the side discharge chute and allow an operator to manually pivot the chute between a lowered position and a raised position relative to the horizontal top surface of the mower deck. The wire form hinge may be low carbon steel, medium carbon steel, high carbon steel, stainless, aluminum, copper, brass or an assortment of other alloyed materials. A force may be applied to bend and change the shape of the wire, rod or bar into the wire form hinge shape described below.

In one embodiment, wire form hinge 128 may have a first end 130, a first leg 132, a first step 134, an intermediate mounting portion 136, a second step 138, a second leg 140, and a second end 142. The first and second legs may be collinear, and both legs may be offset from the intermediate mounting portion by steps 134 and 138. The first leg may be substantially longer than the second leg. The intermediate mounting portion may be mounted directly to the mower deck top surface, and may be substantially flatter than the first and second legs.

Figure 6:
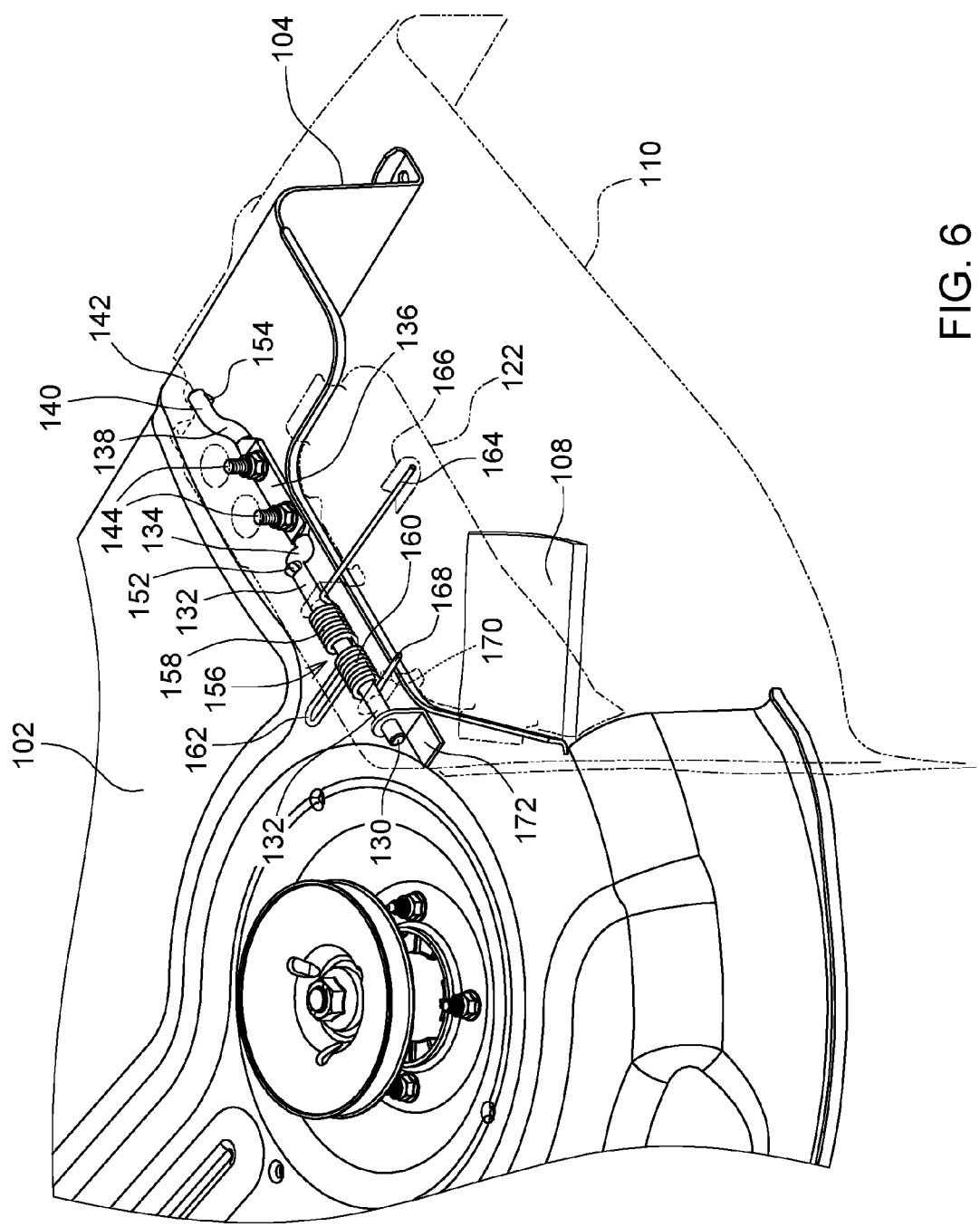
FIG. 6 is a perspective view of a mower deck side discharge chute in a lowered position after completion of mounting on a multi-blade mower deck, according to a first embodiment of the invention.

In a first embodiment, wire form hinge 128 may be attached directly to the horizontal top surface 102 of the mower deck adjacent side discharge outlet 106. Carriage bolts 144 or other fasteners may be inserted through holes 146 in the intermediate mounting portion of the wire form hinge. The carriage bolts may extend through corresponding holes 148 in the top surface of the mower deck and may be secured with nuts 150. Optionally, the first leg or second leg of the wire form hinge also may be inserted through a hole in a small L-shaped bracket 172 welded to the top surface of the mower deck, as shown in FIG. 6. With the intermediate mounting portion of the wire form hinge positioned on the top surface of the mower deck, the first and second legs may be offset sufficiently from the intermediate mounting portion so that each leg may extend horizontally along the top surface of the mower deck adjacent the side discharge outlet, and at least about ½ inch above the deck's top surface. The main chute, or both the main chute and the second or inner chute, may pivot on the same wire form hinge.

In a first embodiment, projections 152, 154 may extend radially from the first and second legs 132, 140 of wire form hinge 128. The radial projections, along with steps 134, 138, may help retain and lock main chute 110 onto the wire form hinge. For example, to slide the main chute on or off the wireform during installation or disassembly, the radial projections may require pivoting the main chute to a raised position, at a specified angle such as 90 degrees relative to the wire form hinge and/or mower deck. For example, as shown in FIGS. 2-5, an installer may pivot the main chute to a raised position at a specified angle to line up radial projections 152, 154 with matching keyways 118, 120 in the bearings or holes 114, 116 along the edge of the main chute. The inner chute may be positioned between the bearings on the main chute, so the inner chute also may be retained on the same wire form hinge.

In a first embodiment, the mower deck side discharge chute mounting may include double torsion spring 156. The double torsion spring may be a single component having two independent coils 158, 160. When assembled, both of the coils may be positioned around the first leg of wire form hinge 128. The double torsion spring also may include a U-shaped stop 162 between the two coiled portions. The double torsion spring may utilize the two independent coils to apply separate and independent downward forces to the main chute 110 and inner chute 122. A first leg 164 may extend radially outwardly from the first coil 158 to engage main chute 110 and apply a downward force to the main chute. For example, the first leg 164 may engage notch 166 on the underside of main chute 110. A second leg 168 may extend radially outwardly from the second coil 160 to engage inner chute 122 and apply a downward force to the inner chute. For example, the second leg may extend through notch or hole 170, or abut the top surface of the inner chute. Thus, in the first embodiment, double torsion spring 156 may bias main chute 110 and inner chute 122 independently to lowered positions with respect to the mower deck. In the second embodiment, the torsion spring may bias only the main chute to the lowered position.

FIGS. 2-5 show how the mower deck side discharge chute may be mounted on a multi-blade mower deck according to a first embodiment. The wire form hinge may be mounted directly to the mower deck before or after the other mounting components are assembled. For example, the main chute, inner chute, double torsion spring and wire form hinge may be pre-assembled together before mounting the assembly on the mower deck. Mounting may be done manually, without using hand tools, faster and at a lower cost than mounting of mower deck side discharge chutes in the past.

Figure 2:
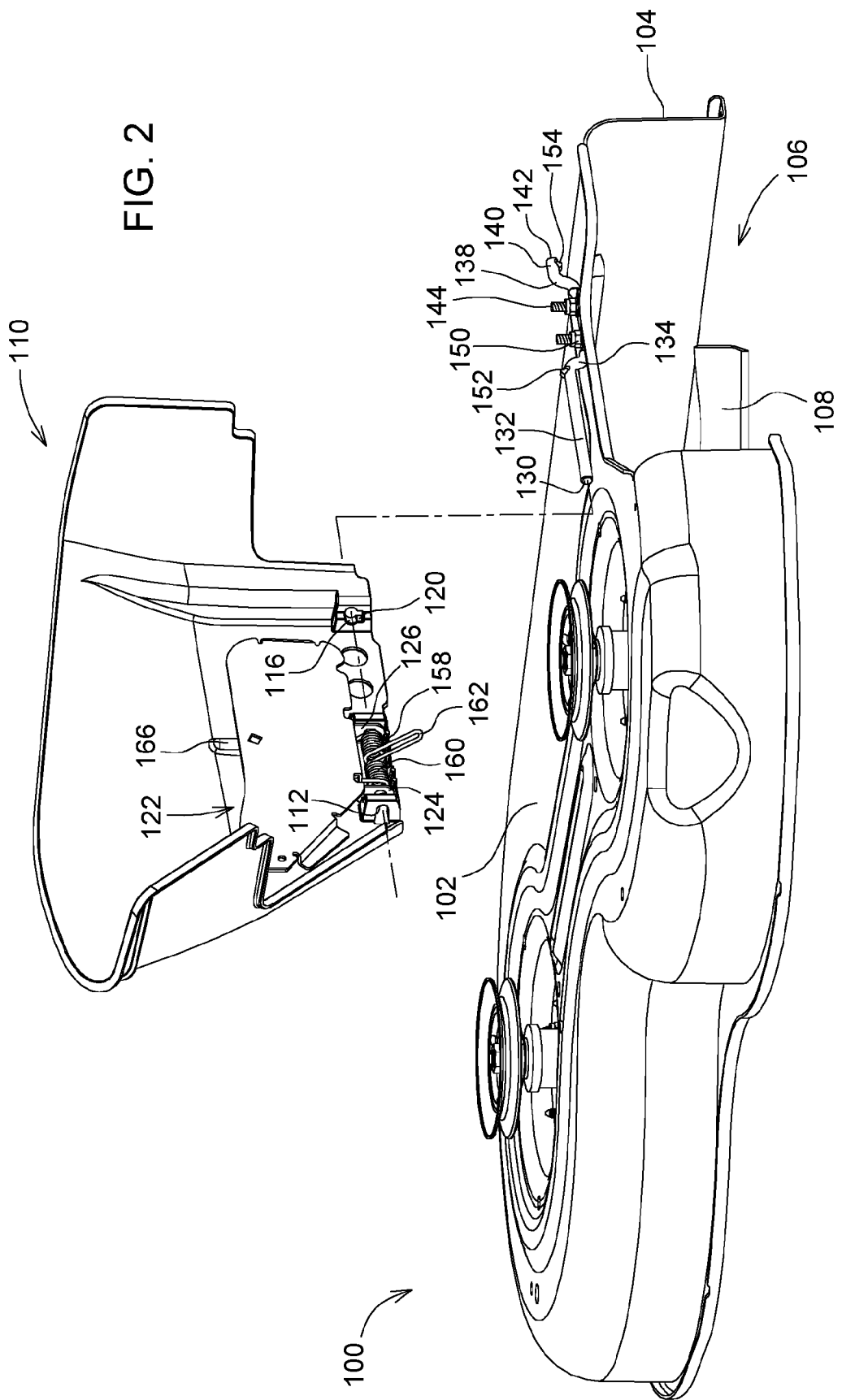
FIG. 2 is a perspective view of a mower deck side discharge chute in a raised position for mounting on a multi-blade mower deck, and the wire form hinge attached to the deck, according to a first embodiment of the invention.

FIG. 2 shows a mower deck side discharge chute in a raised position for mounting on a multi-blade mower deck, with the wire form hinge attached directly to the deck, according to a first embodiment of the invention. Inner chute 122 and double torsion spring 156 may be positioned between the first and second bearings 112, 114 of the main chute, and aligned with the first and second bearings. The double torsion spring's first leg 164 may be inserted into notch 166 on the main chute, and the torsion spring's second leg 168 may be inserted through notch or hole 170 or onto the top surface of the inner chute.

Figure 3:
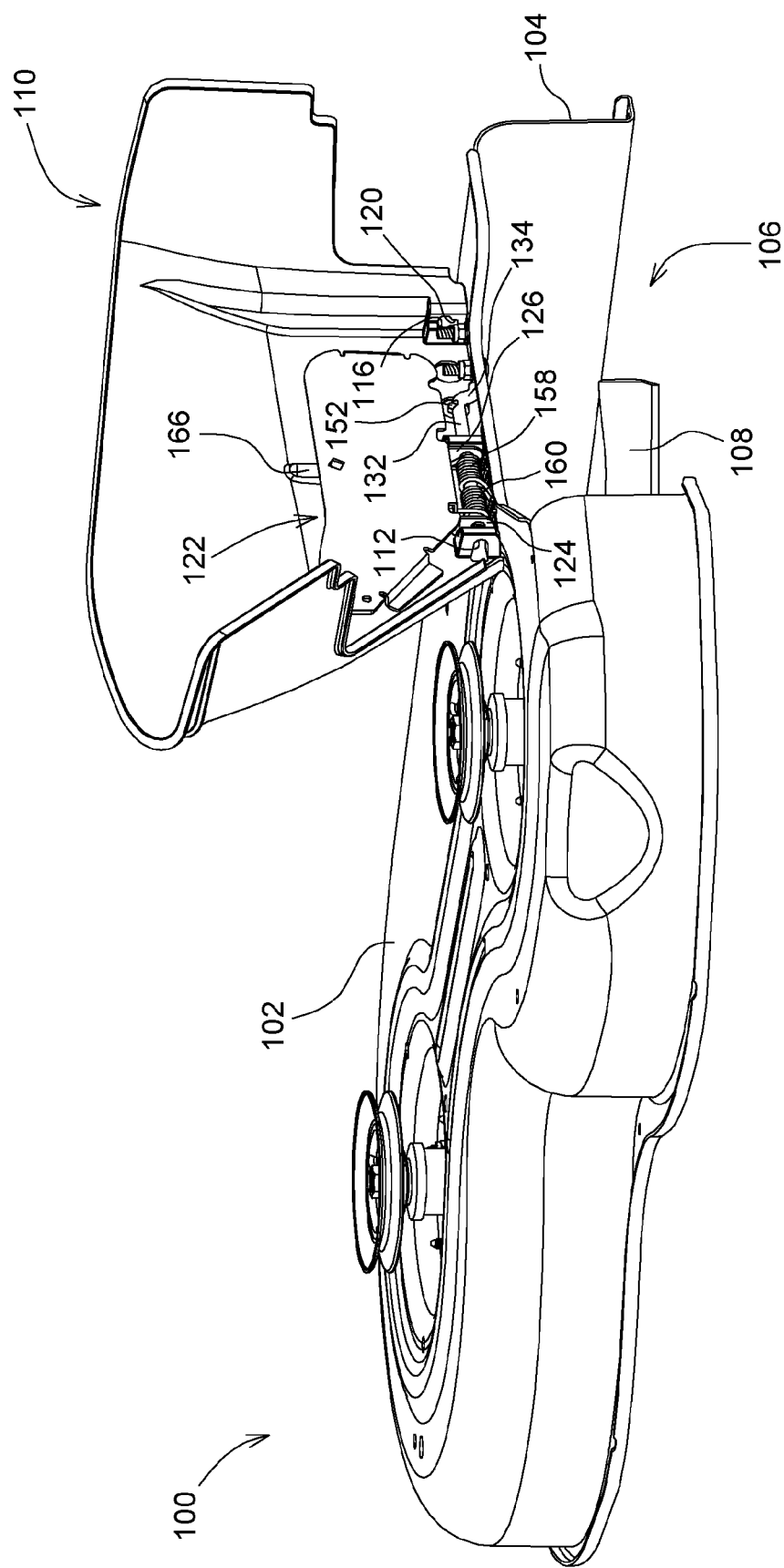
FIG. 3 is a perspective view of a mower deck side discharge chute in a raised position for mounting on a multi-blade mower deck, and the chute sliding onto the wire form hinge, according to a first embodiment of the invention.

FIG. 3 shows a mower deck side discharge chute in a raised position for mounting on a multi-blade mower deck, with the chute sliding onto the wire form hinge, according to a first embodiment of the invention. The installer may slide the main chute 110, inner chute 122 and double torsion spring 156 onto the first leg 132 of the wire form hinge. At the same time, the installer may pivot and raise the main chute to a specified angle such as 90 degrees relative to the wire form hinge and horizontal top surface of the mower deck, so that keyway 118 on bearing 114 may be aligned with projection 152 on the first leg of the wire form hinge. The alignment allows the keyway 118 on bearing 114 to slide past projection 152.

Figure 4:
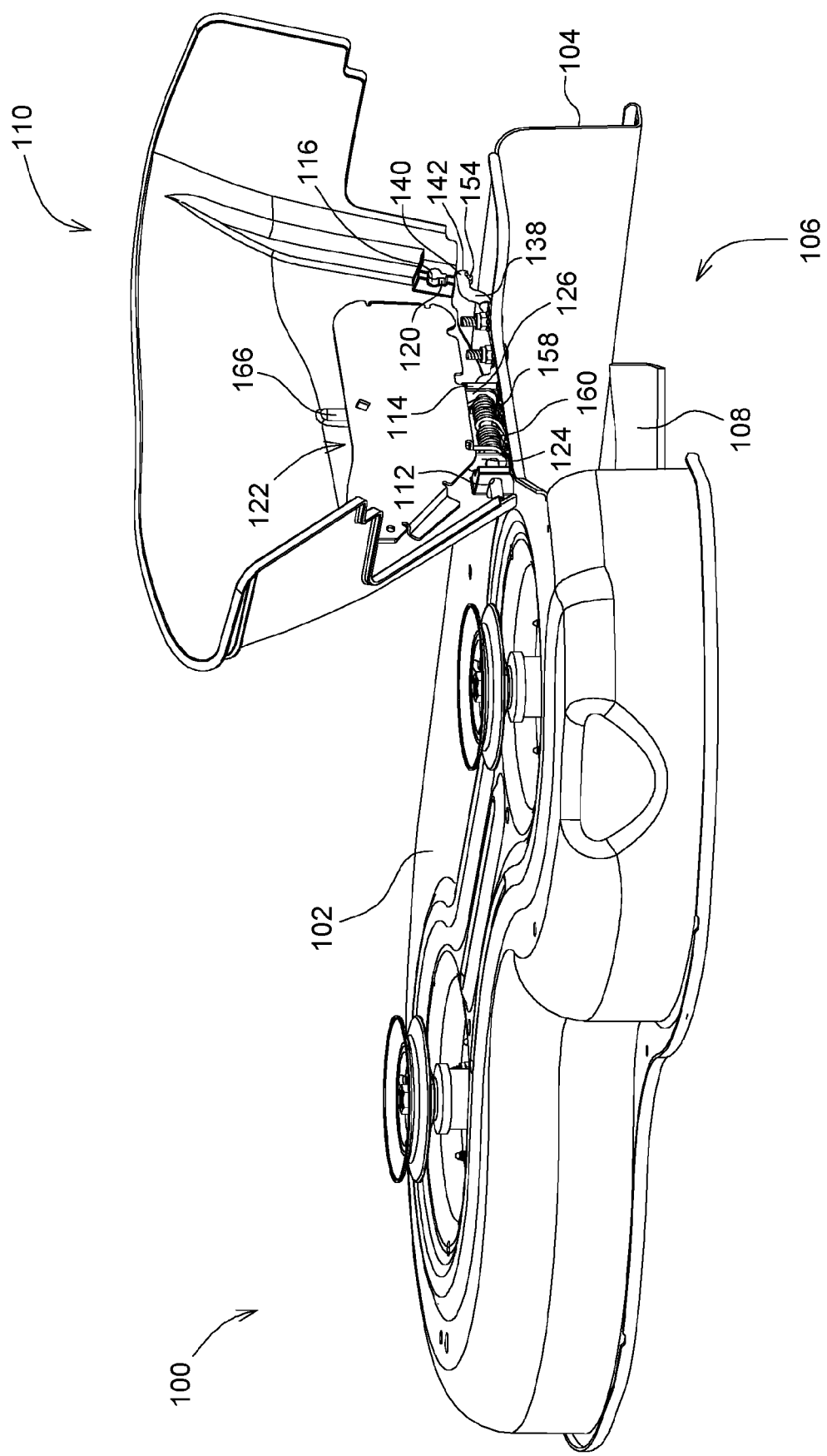
FIG. 4 is a perspective view of a mower deck side discharge chute in a raised position for mounting on a multi-blade mower deck, and the chute deflected over the wire form hinge, according to a first embodiment of the invention.

FIG. 4 shows a mower deck side discharge chute in a raised position for mounting on a multi-blade mower deck, with the chute deflected over the wire form hinge, according to a first embodiment of the invention.

The installer may deflect or bend main chute 110 upwardly sufficiently to move the third bearing 116 over step 138, while holding the main chute in the same raised position relative to the mower deck and wire form. The installer then may slide the main chute, inner chute and double torsion spring in the same direction along the first leg of the wire form hinge until the third bearing 116 reaches the second end 142 of the wire form. The main chute cannot slide any further in the same direction when the second bearing 114 abuts step 134.

Figure 5:
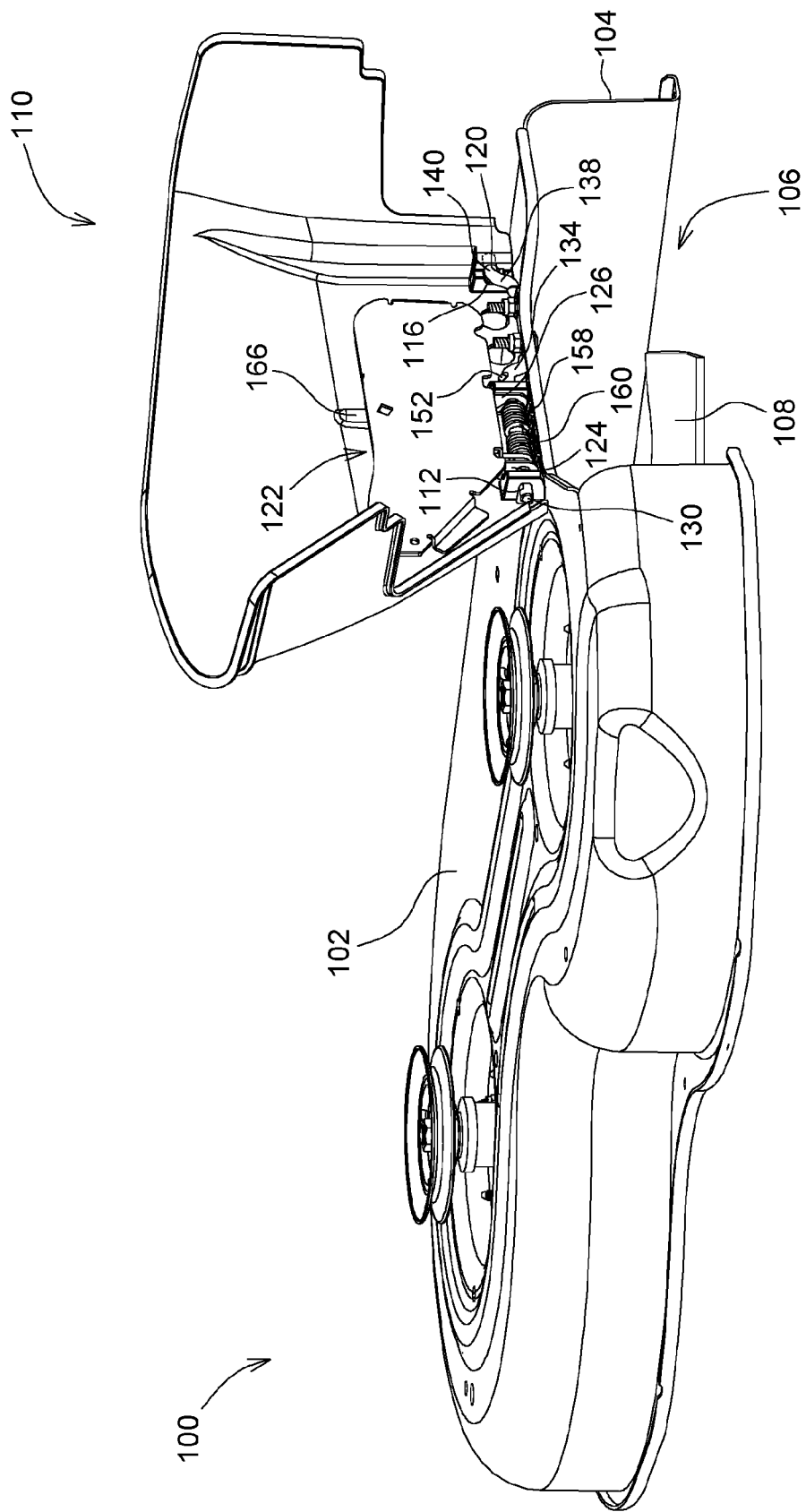
FIG. 5 is a perspective view of a mower deck side discharge chute in a raised position while mounting on a multi-blade mower deck, according to a first embodiment of the invention.

FIG. 5 shows a mower deck side discharge chute in a raised position while mounting on a multi-blade mower deck, according to a first embodiment of the invention. In FIG. 5, the installer has discontinued any deflection of the main chute. The installer also may slide the main chute, inner chute and double torsion spring back in the other direction towards the first end of the wire form, while continuing to hold the main chute at the same raised position. In the raised position, keyway 118 is aligned with projection 152 on the second leg of the wire form hinge, allowing the main chute to slide past projection 152.

FIG. 6 shows a mower deck side discharge chute in a lowered position after completion of mounting on a multi-blade mower deck, according to a first embodiment of the invention. The installer may allow torsion spring 156 to pivot the chute downwardly toward the lowered position relative to the horizontal top surface of the mower deck. The projections on the wire form hinge prevent disassembly or sliding of the chute off the first and the second legs of the wire form hinge while the chute is in the lowered position.

In the first and second embodiments, the mower deck side discharge chute may be mounted to a multi-blade mower deck that is off the traction vehicle. When the multi-blade mower deck is off the traction vehicle, the side discharge chute may be raised to the specified angle needed for mounting or disassembly. If the multi-blade mower deck is on the traction vehicle, or is positioned under the vehicle, the structure of the traction vehicle may block raising the side discharge chute up to the specified angle.

Having described the preferred embodiment, it will become apparent that various modifications can be made without departing from the scope of the invention as defined in the accompanying claims.

The claimed invention is:

1. A mower deck side discharge chute mounting, comprising:
    a wire form hinge having a first leg, a second leg that is collinear with the first leg, and an intermediate mounting portion attached directly to a multi-blade mower deck between the first leg and the second leg;
    a side discharge chute pivoting on the wire form hinge on bearings that can slide on or off the first and the second legs of the wire form hinge only if the side discharge chute is in a raised position relative to the mower deck; and
    a torsion spring biasing the side discharge chute toward a lowered position relative to the mower deck; a keyway in each of the bearings and a radial projection on each of the first and second legs of the wire form hinge that fits through the keyway.

2. The mower deck side discharge chute mounting of claim 1 wherein the torsion spring includes a coil around the first leg of the wire form hinge.

3. The mower deck side discharge chute mounting of claim 1 further comprising a second inner chute pivoting on the wire form hinge under the side discharge chute.

4. A mower deck side discharge chute mounting, comprising:
    a wire form hinge mounted directly to a multi-blade mower deck and having a first leg and a second leg extending through bearings on a side discharge chute;
    a torsion spring on the wire form hinge between the bearings and biasing the side discharge chute toward a lowered position; and
    a radial projection on each of the first and the second legs that fits through a keyway on the bearings only if the side discharge chute is in a raised position.

5. The mower deck side discharge chute mounting of claim 4 wherein the first leg and the second leg are collinear.

6. The mower deck side discharge chute mounting of claim 4 further comprising an intermediate mounting portion between the first leg and the second leg.

7. The mower deck side discharge chute mounting of claim 4 wherein the raised position is about 90 degrees relative to a horizontal top surface of the multi-blade mower deck.

8. The mower deck side discharge chute mounting of claim 4 wherein the torsion spring comprises a first coil and a second coil, and the side discharge chute comprises a main chute independently biased toward the lowered position by the first coil, and a second chute independently biased toward the lowered position by the second coil.

\* \* \* \* \*